(12) United States Patent
Takayama et al.

(10) Patent No.: US 9,663,088 B2
(45) Date of Patent: May 30, 2017

(54) BOOSTER

(75) Inventors: Toshio Takayama, Kai (JP); Masaru Sakuma, Kai (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 1099 days.

(21) Appl. No.: 13/238,508

(22) Filed: Sep. 21, 2011

(65) Prior Publication Data

US 2012/0073286 A1  Mar. 29, 2012

(30) Foreign Application Priority Data

Sep. 29, 2010  (JP) ................. 2010/218872

(51) Int. Cl.
    *B60T 13/74* (2006.01)
    *B60T 7/04* (2006.01)

(52) U.S. Cl.
    CPC ............. *B60T 13/745* (2013.01); *B60T 7/042* (2013.01)

(58) Field of Classification Search
    CPC .............................. B60T 7/042; B60T 13/745
    See application file for complete search history.

(56) References Cited

U.S. PATENT DOCUMENTS

| 7,367,187 | B2 * | 5/2008 | Ikeda et al. ............. | 60/545 |
| 7,823,384 | B2 | 11/2010 | Ikeda et al. | |
| 8,459,753 | B2 * | 6/2013 | Vollert et al. ............ | 303/114.1 |
| 2010/0191400 | A1 * | 7/2010 | Ajiro ..................... | 701/22 |
| 2010/0242469 | A1 * | 9/2010 | Jungbecker et al. ...... | 60/594 |

FOREIGN PATENT DOCUMENTS

| CN | 1911716 | | 2/2007 |
| JP | 2009227230 | * | 10/2009 |
| WO | 2009/068404 | | 6/2009 |
| WO | WO2010/069658 | * | 6/2010 |

OTHER PUBLICATIONS

JP2009227230 Machine translation to English. Oct. 2009.*
Office Action issued Aug. 28, 2014 in corresponding Chinese patent application No. 201110281165.7 (with English translation).
Office Action issued Feb. 2, 2015 in corresponding Chinese patent application No. 2011102811657 (with English translation).

* cited by examiner

*Primary Examiner* — Eric Keasel
*Assistant Examiner* — Michael Quandt
(74) *Attorney, Agent, or Firm* — Wenderoth, Lind & Ponack, L.L.P.

(57) ABSTRACT

An electric booster including a plunger movable by operation of a brake pedal, an electric motor controlled based on a relative displacement between the plunger and the linear motion member, which is detected by a relative displacement sensor, and a ball and screw mechanism. The linear motion member pushes a piston of a master cylinder through a reaction member, thereby generating a brake force. Part of a reaction force from the master cylinder is fed back to the brake pedal through the reaction member. When a reference position sensor detects that a relative position of the plunger to the linear motion member coincides with a predetermined reference position, a detection value of the relative displacement sensor is stored as a relative displacement reference value, and relative displacement between the plunger and the linear motion member is determined.

18 Claims, 11 Drawing Sheets

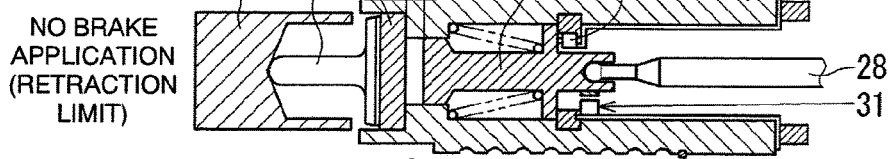
Fig. 2A  NO BRAKE APPLICATION (RETRACTION LIMIT)
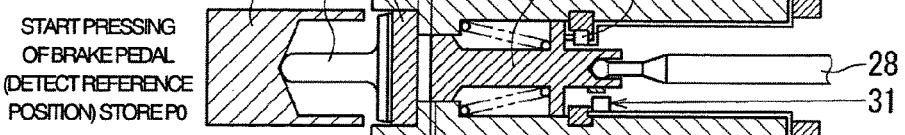
Fig. 2B  START PRESSING OF BRAKE PEDAL (DETECT REFERENCE POSITION) STORE P0
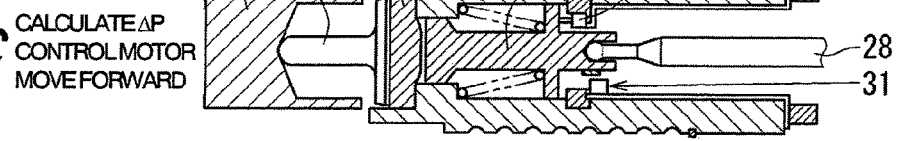
Fig. 2C  CALCULATE ΔP CONTROL MOTOR MOVE FORWARD
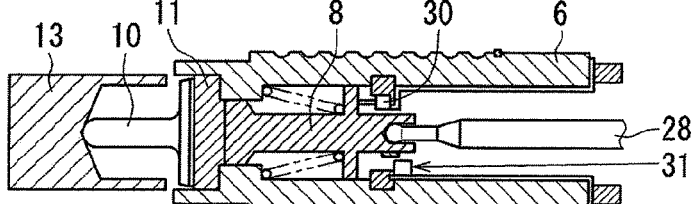
Fig. 2D  MOVE FORWARD
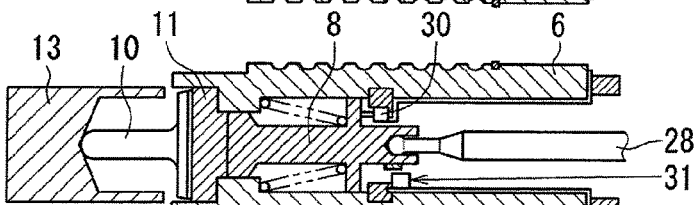
Fig. 2E  MAINTAIN POSITION
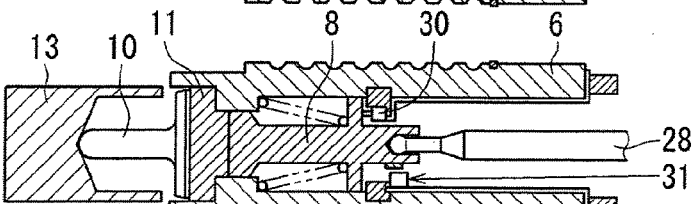
Fig. 2F  MOVE BACKWARD

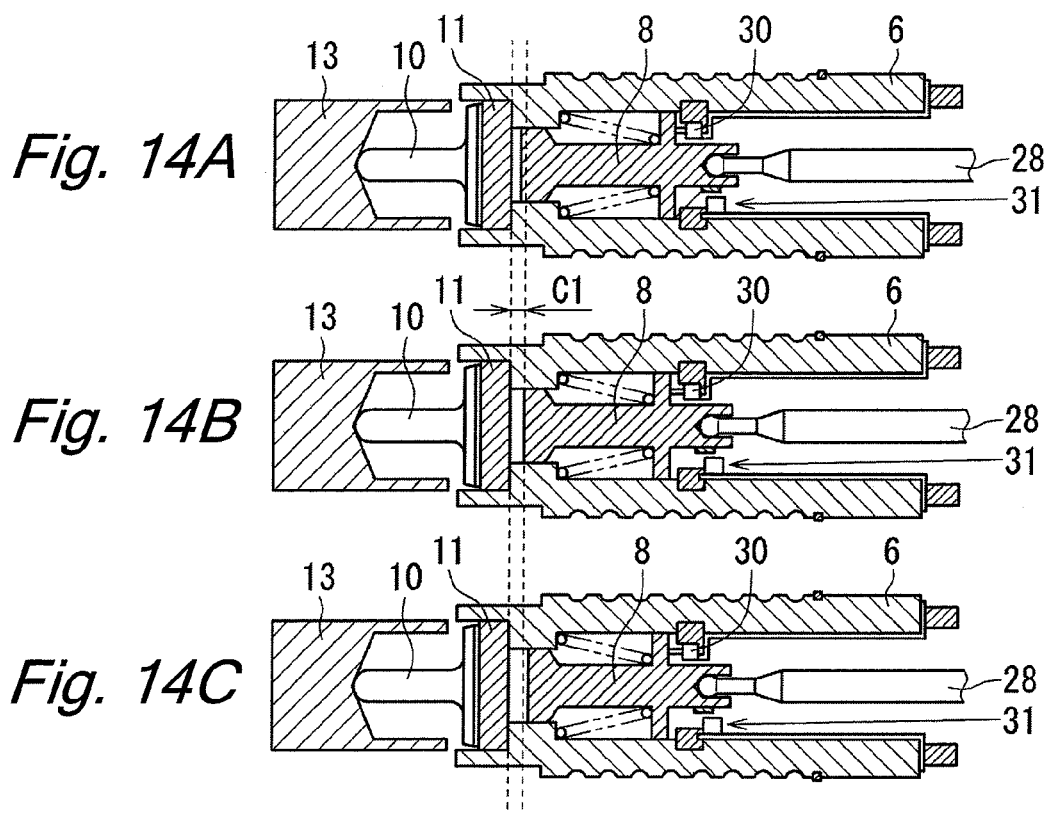
Fig. 14A
Fig. 14B
Fig. 14C
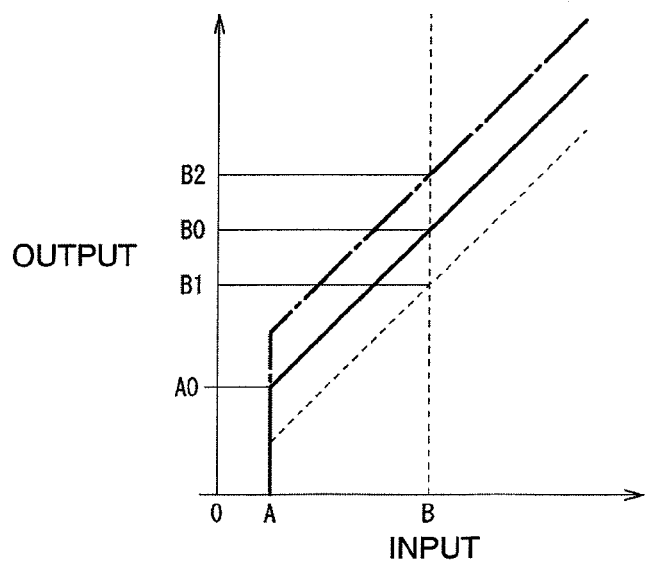
Fig. 15

US 9,663,088 B2

BOOSTER

BACKGROUND OF THE INVENTION

The present invention relates to a booster for use with a brake system of a vehicle.

As one type of booster for use with a brake system of a vehicle, there is known an electric booster which drives an electric motor according to an operation of a brake pedal, advances a piston of a master cylinder via a rotation/linear motion conversion mechanism such as a ball and screw mechanism, and thereby generates a brake hydraulic pressure. For example, International Publication No. 2009/068404 discloses this type of electric booster. The disclosed brake booster is configured to feed back a part of a reaction force from a master cylinder during a brake operation to a brake pedal through a reaction member made of an elastic body such as rubber in a similar manner to a pneumatic booster using an intake negative pressure of an engine as a boosting source, which is adopted in many vehicles. This configuration realizes feedback of a reaction force from the master cylinder to the brake pedal with a simple structure.

SUMMARY OF THE INVENTION

A booster configured to feed back a part of a reaction force from a master cylinder to a brake pedal as mentioned above requires high accuracy regarding the sizes of the respective parts, and the installation positions and detection of various kinds of sensors to improve the control accuracy.

An object of the present invention is to provide a booster with enhanced control accuracy.

To achieve the forgoing and other objects, the present invention is a booster including an input member configured to be moved forward or backward according to an operation of a brake pedal, a boosting member disposed so as to be movable relative to the input member, an actuator configured to drive the boosting member, a thrust force transmission mechanism configured to transmit a thrust force of the input member and the boosting member to a master cylinder, and transmit a reaction force from the master cylinder to the input member and the boosting member at a predetermined ratio, a relative displacement detector configured to detect a relative displacement between the input member and the boosting member, a controller configured to control an operation of the actuator based on the relative displacement detected by the relative displacement detector, and a reference position detector configured to detect that a relative position of the input member to the boosting member coincides with a predetermined reference position.

According to the booster of the present invention, it is possible to improve control accuracy.

BRIEF DESCRIPTION OF THE DRAWINGS

FIGS. 2A to 2F illustrate how a linear motion member, a plunger, and a reaction member of the electric booster shown in FIG. 1 operate;

FIGS. 14A to 14C illustrate dimension errors of a space between the plunger and a reaction member in the electric booster shown in FIG. 1;

FIG. 15 is a graph illustrating the input/output characteristic of the electric booster shown in FIG. 1;

DETAILED DESCRIPTION OF THE INVENTION

Figure 1:
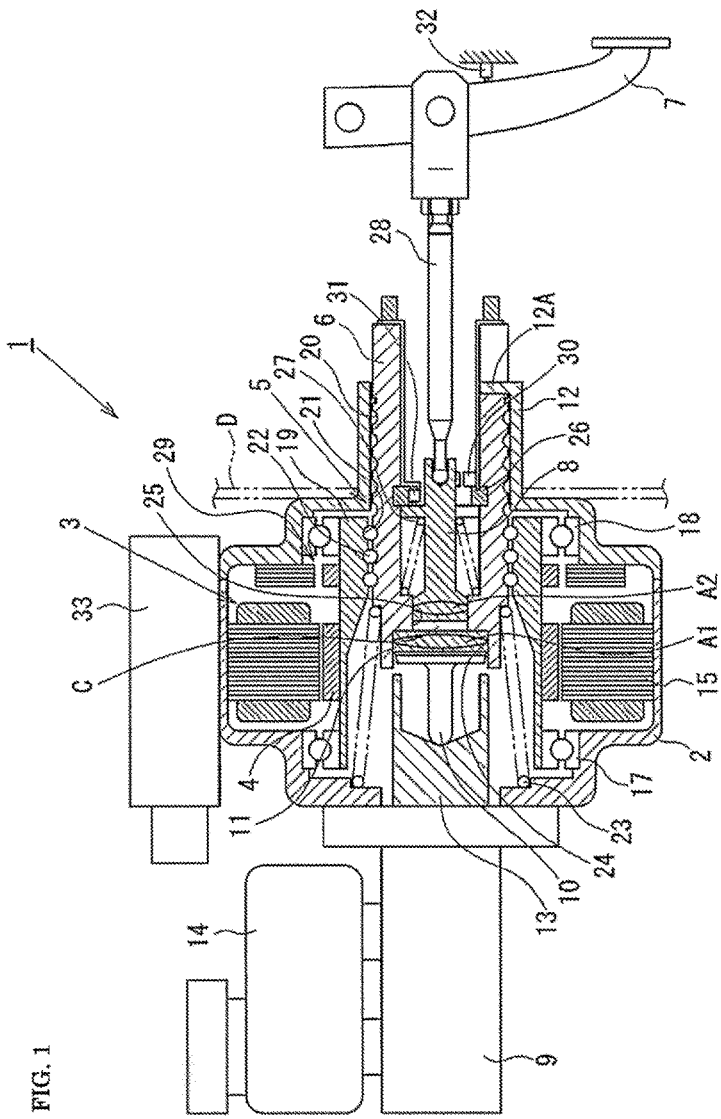
FIG. 1 is a vertical cross-sectional view illustrating a structural overview of an electric booster according to a first embodiment of the present invention.

Hereinafter, embodiments of the present invention will be described in detail with reference to the accompanying drawings. First, an electric booster according to a first embodiment of the present invention will be described with reference to FIGS. 1 to 5. As shown in FIG. 1, the electric booster 1 according to the present embodiment includes an electric motor 3, a ball and screw mechanism 5, a plunger 8, an output rod 10, and a reaction member 11, all of which are contained in a housing 2. The ball and screw mechanism 5 functions as a rotation/liner motion conversion mechanism for converting a rotation of a rotor 4 of the electric motor 3 into a linear motion. The plunger 8 is inserted in a linear motion member 6 of the ball and screw mechanism 5, and is coupled with a brake pedal 7. The output rod 10 transmits a thrust force of the linear motion member 6 and the plunger 8 to a master cylinder 9. The reaction member 11 is disposed among the output rod 10, the linear motion member 6, and the plunger 8.

The housing 2 is attached to the engine-room side of a dash panel D which is a partition wall separating a vehicle compartment from an engine room or the like, and is disposed such that a cylindrical portion 12 of the housing 2 at the rear side thereof extends into the vehicle compartment through the dash panel D. The master cylinder 9, which is disposed concentrically with the cylindrical portion 12, is attached to the front of the housing 2. A piston 13 of the master cylinder 9 is inserted in the housing 2. The master cylinder 9 is a known master cylinder which reserves brake fluid in a reservoir 14, and generates a brake hydraulic pressure by advancing the piston 13 to thereby supply the brake hydraulic pressure to a brake apparatus of each wheel. The master cylinder may be embodied by either a tandem-type master cylinder or a single-type master cylinder.

The electric motor 3 serves as an actuator for driving the ball and screw mechanism 5, and includes a stator 15 fixed in the housing 2, and the cylindrical rotor 4 inserted through the stator 15 and rotatably supported thereby. The electric motor 3 can control a rotation of the rotor 4 based on control current, and may be embodied by, for example, a synchronous motor or an induction motor.

The ball and screw mechanism 5 includes a cylindrical rotational member 19, the linear motion member 6, and a plurality of balls 22. The rotational member 19 is rotatably supported by the housing 2 through bearings 17 and 18. The linear motion member 6 is inserted through the rotational member 19 and the cylindrical portion 12 of the housing 2, and is supported so as to be movable along the axial direction and be prevented from rotating around the axis. The balls 22 function as rolling bodies each disposed between helical ball grooves 20 and 21 formed on the opposing surfaces of the linear motion member 6 and the rotational member 19. A rotation of the rotational member 19 causes rolling motions of the balls 22, and thereby causes the linear motion member 6 to move along the axial direction. Further, the ball and screw mechanism 5 can also convert a linear motion of the linear motion member 6 into a rotation of the rotational member 19. The present embodiment employs the ball and screw mechanism 5 as a rotation/linear motion conversion mechanism, but may employ another type of rotation/linear motion conversion mechanism capable of converting a rotation of the rotor 4 of the electric motor 3 into a linear motion, such as a roller and screw mechanism.

Figure 7:
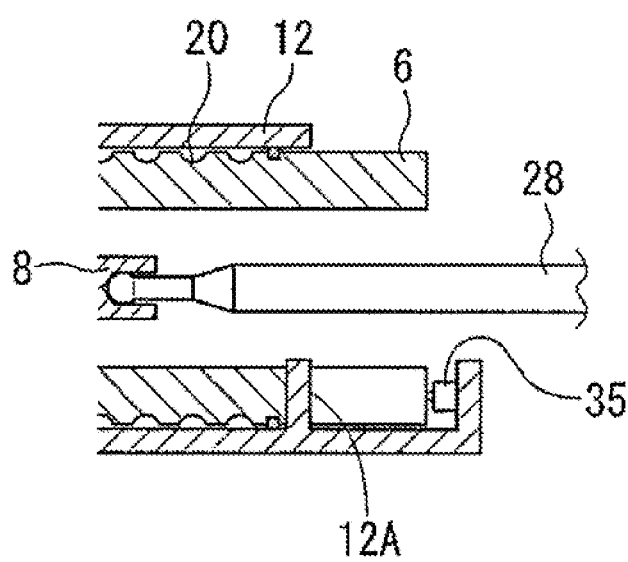
FIG. 7 illustrates a return switch of a linear motion member and the vicinity thereof of an electric booster according to a third embodiment of the present invention.

The rotational member 19 is inserted through the rotor 4 of the electric motor 3, and is coupled so as to be integrally rotatable with the rotor 4. The linear motion member 6 has the front end facing the piston 13 of the master cylinder 9 so as to be operable as a boosting member. The rear portion of the linear motion member 6 is inserted through the cylindrical portion 12 of the housing 2, and the linear motion member 6 is prevented from axially rotating and from moving backward beyond a retracted position by a stopper 12A provided at the cylindrical portion 12. As shown in FIG. 7, the stopper 12A is received in a slot formed in the rear portion of the linear motion member 6. The linear motion member 6 is biased in the retraction direction to abut against the stopper 12A by the spring force of a return spring 23 which is a tapered coil spring disposed between the linear motion member 6 and the front wall of the housing 2. The present embodiment is configured such that the rotational member 19 is directly driven by the rotor 4, but in other embodiments, a speed reduction mechanism such as a gear and a pulley may be disposed between the rotational member 19 and the rotor 4.

The plunger 8 is an input member movable forward or backward according to an operation of the brake pedal 7, and is movably guided along the axial direction in the linear motion member 6. A stepped bore constituted by a large-diameter bore 24 and a small-diameter bore 25 is formed at the front end of the linear motion member 6, which faces the piston 13 of the master cylinder 9. The front end of the plunger 8 is slidably inserted in the small-diameter bore 25. The retracted position of the plunger 8 is determined by a stopper 26 provided at the linear motion member 6. The plunger 8 is biased in the retraction direction to abut against the stopper 26 by the spring force of a return spring 27 which is a tapered coil spring disposed between the plunger 8 and the linear motion member 6.

The circular reaction member 11, which is made of an elastic body such as rubber, is fitted in the large-diameter bore 24, and a flange formed at the proximal end of the output rod 10 abuts against the reaction member 11. A predetermined space C is defined between the front end of the plunger 8 inserted in the small-diameter bore 25 and the reaction member 11, when the plunger 8 is located at the retraction position in abutment with the stopper 26. The reaction member 11 is configured to be engaged with the linear motion member 6 and the plunger 8 to constitute a thrust force transmission mechanism which transmits a thrust force from them to the master cylinder 9. When the linear motion member 6 and the plunger 8 move forward to cause the output rod 10 to push the piston 13 of the master cylinder 9 through the reaction member 11, a reaction force is fed back to the linear motion member 6 and the plunger 8 according to pressure-receiving areas of the linear motion member 6 and the plunger 8 to the reaction member 11, which is determined from the cross-sectional area A1 of the large-diameter bore 24 and the cross-sectional area A2 of the small-diameter bore 25. The rear end of the plunger 8 is coupled to the brake pedal 7 via the input rod 28.

A rotational position sensor 29 is mounted on housing 2. The rotational position sensor 29 detects a rotational position of the rotational member 19 of the ball-screw mechanism 5, i.e., the rotor 4 of the electric motor 3, and is embodied by, for example, a resolver. A relative displacement sensor 30 is disposed between the linear motion member 6 and the plunger 8 as a relative position detector for detecting a relative displacement therebetween. The relative displacement sensor 30 may be embodied by, for example, a potentiometer which detects a relative displacement as an analog signal based on, for example, a change in the resistance value.

Further, a reference position sensor 31 is mounted on the linear motion member 6 as a reference position detector for detecting whether a relative position of the plunger 8 to the linear motion member 6 coincides with a predetermined reference position. The reference position sensor 31 detects whether the plunger 8 is located relative to the linear motion member 6 at the reference position which is a position displaced forward (moved toward the reaction member 11) by a predetermine distance $\Delta T$ (refer to FIG. 2B) from the position where the plunger 8 is maximally retracted to abut against the stopper 26 (refer to FIG. 2A). The reference position sensor 31 may be embodied by, for example, a known limit switch. The reference position sensor 31 may output either an ON or OFF signal upon detection of the reference position.

A brake pedal sensor (brake switch) 32 is mounted on the brake pedal 7 for detecting whether the brake pedal 7 is pressed. The brake pedal sensor 32 can be embodied by a known limit switch, as is the case with the reference position sensor 31, but may be embodied by a known brake lamp switch which supplies power to a brake lamp in response to pressing of the brake pedal 7.

A controller 33 as a control means is mounted on the housing 2. The controller 33 controls an operation of the electric motor 3 by supplying control current based on detection signals from various sensors, including output signals from the rotational position sensor 29, the reference position sensor 31, relative displacement sensor 30, and the brake pedal sensor 32. The control of the controller 33 will be described below with reference to FIGS. 2A-2F.

As shown in FIG. 2A, when the vehicle is in a non-braked state with the brake pedal 7 not pressed, the linear motion member 6 and the plunger 8 are located at their respective retracted positions defined by the stopper 12A and the stopper 26 by receiving the spring forces of the return springs 23 and 27. At this time, the predetermined space C is formed between the reaction member 11 and the plunger 8. Further, in this state, the relative displacement sensor 30 detects the relative displacement between the linear motion member 6 and the plunger 8, the reference position sensor 31 does not detect the reference position, and the brake pedal sensor 32 does not detect pressing of the brake pedal 7.

As shown in FIG. 2B, when the brake pedal 7 is pressed, the plunger 8 is moved forward relative to the linear motion member 6 by the predetermined distance ΔT through the input rod 28 to reach the predetermined reference position. At this time, the reference position sensor 31 detects that the plunger 8 is located at the reference position. At this time, the controller 33 stores the detection value of the relative displacement sensor 30 as a relative displacement reference value P0, and starts control of the electric motor 3 based on the relative displacement. When the brake pedal 7 start to be operated, the brake pedal sensor 32 detects it.

When the brake pedal 7 is further pressed, the controller 33 calculates a relative displacement ΔP (ΔP=P−P0) between the linear motion member 6 and the plunger 8 by subtracting the relative displacement reference value P0 from a present detection value P of the relative displacement sensor 30. Then, the controller 33 controls the operation of the electric motor 3 by outputting control current based on the relative displacement ΔP, so as to move forward the linear motion member 6(refer to FIGS. 2C and 2D), maintain the linear motion member 6 at the same position (refer to FIG. 2E), or move backward the linear motion member 6 (refer to FIG. 2F) to maintain the relative displacement ΔP within a predetermined range, thereby causing the linear motion member 6 to follow the movement of the plunger 8.

When the plunger 8 is moved forward according to pressing of the brake pedal 7, the linear motion member 6 is also moved forward to follow the plunger 8 by receiving the thrust force of the electric motor 3, and starts to push the output rod 10 through the reaction member 11 to thrust the piston 13 of the master cylinder 9. As a result, a brake force is generated by the thus-generated hydraulic pressure. The reaction member 11 is deformed by being compressed between the linear motion member 6 and the output rod 10 (refer to FIG. 2C), and abuts against the front end of the advanced plunger 8 (refer to FIG. 2D). As a result, the reaction force from the piston 13 of the master cylinder 9 is transmitted to the linear motion member 6 and the plunger 8 through the reaction member 11. At this time, a part of the reaction force is fed back to the brake pedal 7 through the plunger 8 according to the ratio of the A1, which is the pressure-receiving area A1 of the linear motion member 6 to the reaction member 11, to the A2 (<A1), which is the pressure-receiving area of the plunger 8 to the reaction member 11. Such pressing of the brake pedal 7 can generate a brake force at a predetermined boosting ratio, and control the brake force according to the pressing force.

The formation of the predetermined space C1 (so-called jump-in clearance) between the plunger 8 and the reaction member 11 when a brake operation is started (when the plunger 8 is located at the reference position) allows the plunger 8 to be moved forward by a predetermined distance without receiving the reaction force from the reaction member 11, thereby enabling a quick rise of the brake force at the early stage of the brake operation.

Figure 3:
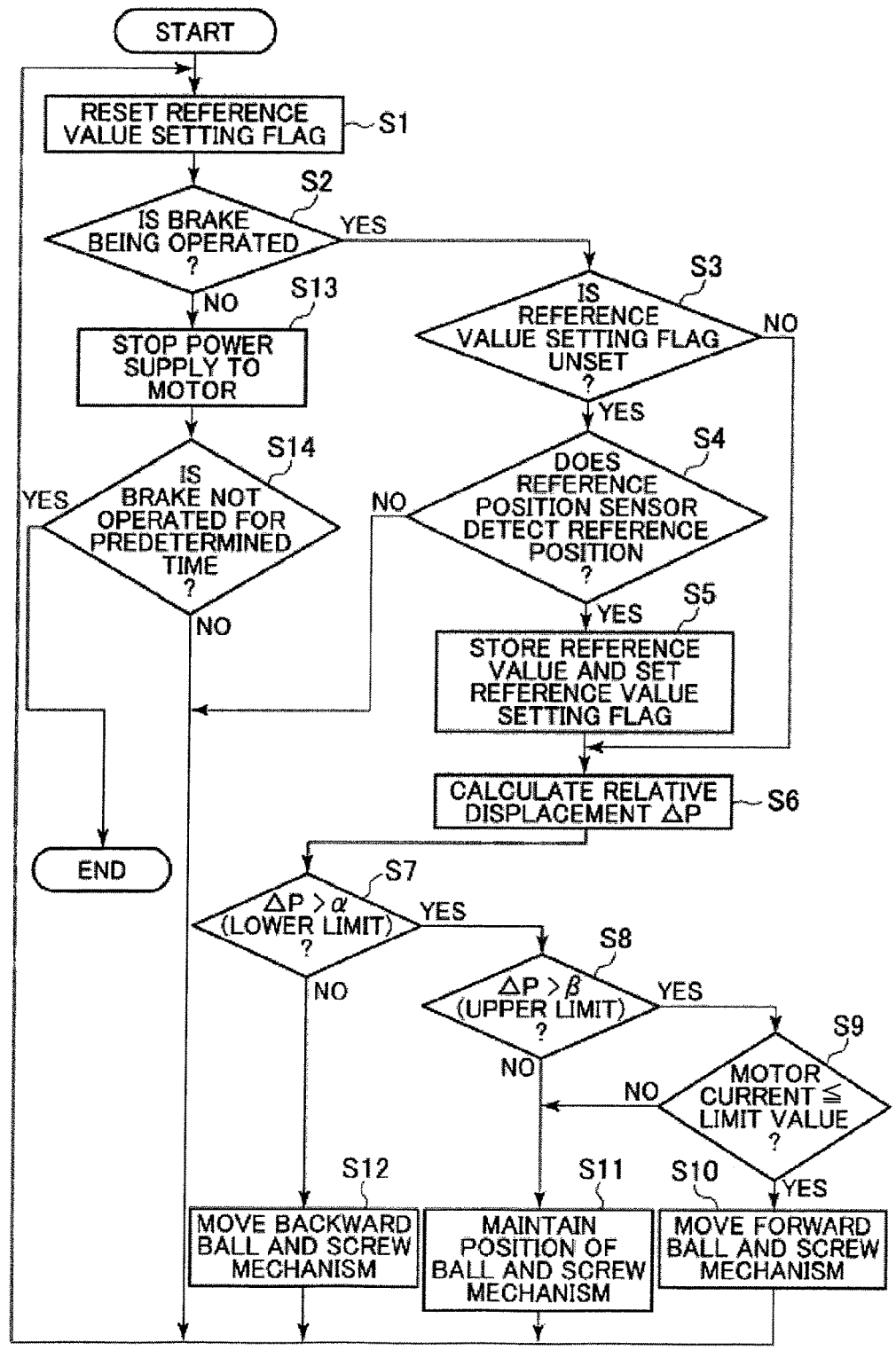
FIG. 3 is a flowchart illustrating control of the electric booster shown in FIG. 1.

Next, an example of a control flow when the controller 33 controls the electric motor 3 will be described with reference to FIG. 3. In the flowchart of FIG. 3, the processing is started when the brake pedal sensor 32 detects pressing of the brake pedal 7. In step S1, the controller 33 resets a reference value setting flag, and the processing proceeds to step S2. In step S2, the controller 33 determines whether the brake pedal 7 is currently being operated based on the detection of the brake pedal sensor 32. If the determination results indicate that the brake pedal 7 is currently being operated, the processing proceeds to step S3.

In step 3, the controller 33 determines whether the reference value setting flag is unset. If the reference value setting flag is unset, the processing proceeds to step S4, in which the controller 33 stores the relative displacement reference value P0. On the other hand, if the reference value setting flag is set, the processing proceeds to step S6, because the relative displacement reference value P0 has been already stored.

In step S4, the controller 33 determines whether the reference position sensor 31 detects that the plunger 8 is located at the reference position. If the reference position is not detected, the processing returns to step S2, because the plunger 8 does not yet reach the reference position. If the reference position is detected, the processing proceeds to step S5. In step S5, the controller 33 stores, as the relative displacement reference value P0, the detection value of the relative displacement sensor 30 when the reference position sensor 31 detects that the plunger 8 reaches the reference position. At the same time, the controller 33 sets the reference value setting flag. Then, the processing proceeds to step S6.

In step S6, the controller 33 calculates the relative displacement ΔP (ΔP=P−P0) of the plunger 8 from the relative displacement reference value P0 relative to the linear motion member 6 by subtracting the relative displacement reference value P0 stored in the above step from the present detection value P of the relative displacement sensor 30. Then, the processing proceeds to step S7.

In step S7, the controller 33 compares the relative displacement ΔP with a lower limit value α of a predetermined range of α to β. If the relative displacement ΔP is larger than the lower limit value α (ΔP>α), the controller 33 determines that the plunger 8 is at least not moved backward. Then, the processing proceeds to step S8.

Figure 4:
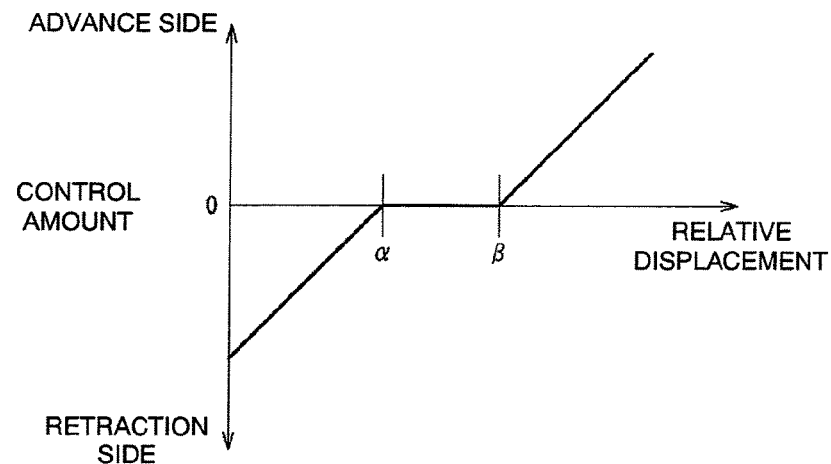
FIG. 4 is a graph illustrating control of an electric motor of the electric booster shown in FIG. 1.

As shown in FIG. 4, the lower limit value α of the predetermined range of α to β is a value set as a target value of relative displacement amount for controlling the electric motor 3 in the direction moving the linear motion member 6 backward, while the upper limit value β is a value set as a target value of relative displacement amount for controlling the electric motor 3 in the direction moving the linear motion member 6 forward. In the present embodiment, the lower limit value α is a value when the relative displacement ΔP between the plunger 8 and the linear motion member 6 is zero, i.e., the detection value of the relative displacement sensor 30 is equal to the relative displacement reference value P0. The upper limit value β is a value required for providing hysteresis to the input/output characteristic, and is set as a smaller value than the above-described space C1.

In step S8, the controller 33 compares the relative displacement ΔP with the above-mentioned upper limit value β. If the relative displacement ΔP is larger than the upper limit value β (ΔP>β), the controller 33 determines that the plunger 8 is currently being moved forward, i.e., the brake pedal 7 is currently being pressed, and then the processing proceeds to step S9.

In step S9, the controller 33 determines whether control current to be supplied to the electric motor 3 so as to reduce the relative displacement ΔP to the upper limit value β is equal to or smaller than a predetermined limit value. If the control current is equal to or smaller than the limit value, the processing proceeds to step S10, in which the controller 33 applies feedback control to the electric motor 3 so as to reduce the relative displacement ΔP to the upper limit value β, and rotates the electric motor 3 in the direction moving the linear motion member 6 forward. Then, the processing returns to step S2. On the other hand, if the control current exceeds the limit value, the processing proceeds to step S11, in which the controller 33 controls the electric motor 3 so as to maintain the rotational position thereof. Then, the processing returns to step S2. As a result, it is possible to prevent a supply of overcurrent to the electric motor 3 to protect the electric motor 3.

Further, in step S8, if the relative displacement ΔP is equal to or smaller than the upper limit value β (ΔP<=β), the controller 33 determines that the operation of the plunger 8 is stopped, i.e., the pressing of the brake pedal 7 is maintained at a substantially constant level, and then processing proceeds to step S11, in which the controller 33 controls the electric motor so as to maintain the rotational position thereof. Then, the processing returns to step S2.

In step S7, if the relative displacement ΔP is equal to or smaller than the lower limit value α (ΔP<=α), the controller 33 determines that the plunger 8 is moved backward, i.e., the brake pedal 7 is currently being released, and the processing proceeds to step S12. In step S12, the controller 33 applies feedback control to the electric motor 33 so as to increase the relative displacement ΔP to the lower limit value α, and rotates the electric motor 3 in the direction moving the linear motion member 6 backward. Then, the processing returns to step S2.

In step S2, if the controller 33 determines that the brake pedal 7 is not currently being operated, the processing proceeds to step S13 in which the controller 33 stops the power supply to the electric motor 3, or maintains such a state that power is not supplied to the electric motor 3, and then the processing proceeds to step S14. In step S14, the controller 33 determines whether a predetermined time, for example, approximately two minutes have passed since the brake pedal sensor 32 detects that the status of the brake pedal 7 is changed from a pressed state to a released state. If the predetermined time has passed, the present processing of the flowchart is ended.

In this way, the controller 33 controls an operation of the electric motor 3 according to an operation of the brake pedal 7 so that the linear motion member 6 follows a movement of the plunger 8, thereby generating a brake force at the predetermined boosting ratio to control a brake force according to a pedal pressing force. At this time, the detection value of the relative displacement sensor 30 is corrected by the reference position sensor 31, whereby it is possible to reduce the influence of, for example, a signal drift of the relative displacement sensor 30 due to a temperature change to improve the control accuracy while providing stabilized control.

At this time, as shown in FIG. 4, when the relative displacement ΔP between the plunger 8 and the linear motion member 6 is reduced or increased beyond the predetermined range α to β, adjusting the control amount so as to increase the rotational amount of the electric motor 3 in proportion to the value of the relative displacement ΔP can improve the responsiveness, and provide highly accurate and stabilized control.

Further, in the control flow shown in FIG. 3, the setting (storage) of the relative displacement reference value P0 of the relative displacement sensor 30 is performed each time the brake pedal 7 is operated and the reference position sensor 31 detects that the plunger 8 is located at the reference position. However, the setting of the relative displacement reference value P0 is not limited thereto, and may be arbitrarily performed and updated based on an elapsed time or another condition.

Figure 5:
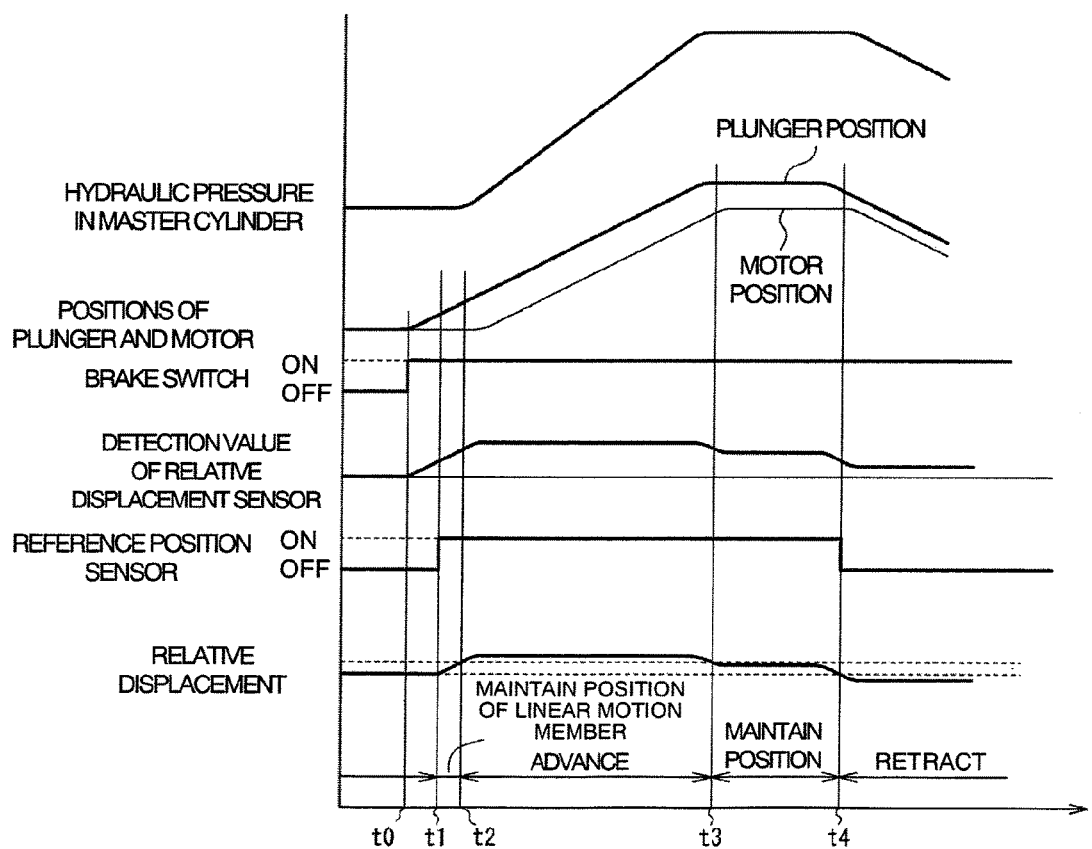
FIG. 5 is a time chart illustrating an example of an operation of the electric booster shown in FIG. 1.

Next, an example of the operation of the electric booster 1 will be described with reference to FIG. 5. FIG. 5 is a time chart when the brake pedal 7 is pressed at a predetermined speed, is maintained at that position, and then is released at a predetermined speed.

At time t0, a driver starts to press the brake pedal 7, and the brake pedal sensor 32 detects that. The pressing of the brake pedal 7 causes the plunger 8 to be moved forward. When the plunger 8 reaches the reference position at time t1, the reference position sensor 31 detects that, and the detection value of the relative displacement sensor 30 is stored as the relative displacement reference value P0. At this time, the controller 33 starts to calculate the relative displacement ΔP from the relative displacement reference value P0. At time t2, when the relative displacement ΔP exceeds the upper limit value β, the electric motor 3 starts to be rotated, which causes the linear motion member 6 to be moved forward to push the piston, so that the hydraulic pressure in the master cylinder 9 starts to be increased. After that, the hydraulic pressure in the master cylinder 9 is increased at a predetermined rate according to the advancement of the plunger 8 and the linear motion member 6. At time t3, the driver maintains the brake pedal 7 at the pressed position, so that the relative displacement ΔP is kept within the above-mentioned range of the lower limit value α to the upper limit value β (α<ΔP<β), and the rotational position of the electric motor 3 is maintained. Therefore, the hydraulic pressure of the master cylinder 9 is also maintained. After that, at time t4, the driver starts to return the brake pedal 7, so that the relative displacement ΔP is reduced to be smaller than the lower limit value α, the electric motor 3 is rotated to move back the linear motion member 6 and therefore the piston 13, and the hydraulic pressure in the master cylinder 9 is released.

Next, a second embodiment of the present invention will be described with reference to FIG. 6. In the following description, like elements will be denoted by the same reference numerals as those in the first embodiment, and only different elements will be described in detail.

Figure 6:
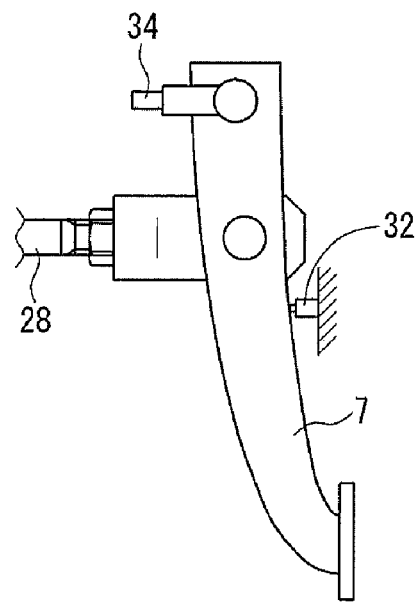
FIG. 6 illustrates a brake pedal and the vicinity thereof of an electric booster according to a second embodiment of the present invention.

As shown in FIG. 6, the present embodiment does not have the relative displacement sensor 30, but instead has a stroke sensor 34 configured to detect a stroke of the brake pedal 7. The stroke sensor 34 is used as an input member displacement detector configured to detect a displacement of the plunger 8. Further, the rotational position sensor 29 is used as a boosting member displacement detector configured to detect a displacement of the linear motion member 6. The controller 33 calculates the relative displacement ΔP between the linear motion member 6 and the plunger 8 based on a difference between a detection value Pm of the rotational position sensor 29 and a detection value Ps of the stroke sensor 34. At this time, as is the case with the above-described first embodiment, the controller 33 stores the detection values of the rotational position sensor 29 and the stroke sensor 34 as control reference values Pm0 and Ps0 when the reference position sensor 31 detects that the plunger 8 is located at the reference position, and calculates the relative displacement AP from differences between the present detection values Pm and Ps of the rotational position sensor 29 and the stroke sensor 34, and the control reference values Pm0 and Ps0 as the relative displacement reference values. The controller 33 controls an operation of the electric motor 3 based on the thus-calculated relative displacement ΔP in the same manner as the first embodiment.

At this time, since the rotational member 19 of the ball and screw mechanism 5 is coupled to the rotor 4 of the electric motor 3, the position (displacement) of the linear motion member 6 can be obtained by multiplying the detection value Pm of the rotational position sensor 29 by a predetermined coefficient K1 or by referring to a predetermined conversion table. Further, since the plunger 8 is coupled to the brake pedal 7 via the input rod 28, the position (displacement) of the plunger 8 can be obtained by multiplying the detection value Ps of the stroke sensor 34 by a predetermined coefficient K2 or by referring to a predetermined conversion table. Converting each them with use of conversion tables can provide the positions of the linear motion member 6 and the plunger 8, even if they are in non-linear positional relationships. Then, the controller 33 controls an operation of the electric motor 3 based on the thus-obtained relative displacement ΔP calculated from the position (displacement) of the linear motion member 6 and the position (displacement) of the plunger 8, in the same manner as the first embodiment.

In this case, a part of the control flow shown in FIG. 3 is changed as follows. As a first difference, in step S5, when the reference position sensor 31 detects that the plunger 8 reaches the reference position, the controller 33 stores the detection value of the rotational position sensor 29 as the control reference value Pm0, stores the detection value of the stroke sensor 34 as the control reference value Ps0, and sets the reference value setting flag. Then, the processing proceeds to step S6. In step S6, the controller 33 calculates the position of the linear motion member 6 by subtracting the stored control reference value Pm0 from the present detection value Pm of the rotational position sensor 29 and then multiplying the resulting value by the predetermined coefficient K1, or by referring to the predetermined conversion table. Further, the controller 33 calculates the position of the plunger 8 by subtracting the stored control reference value Ps0 from the present detection value Pm of the stroke sensor 34 and then multiplying the resulting value by the predetermined coefficient K2, or by referring to the predetermined conversion table. Then, the controller 33 calculates the relative displacement ΔP between the plunger 8 and the linear motion member 6 (ΔP=K1*(Pm−Pm0)−K2*(Ps−Ps0)). The controller 33 controls an operation of the electric motor 3 based on the thus-calculated relative displacement ΔP by comparing it with the predetermined range α to β.

In the above-described control flow, the controller 33 stores the control reference values Pm0 and Ps0 for both the detection value Pm of the rotational position sensor 29, which indicates the position of the linear motion member 6, and the detection value Ps of the stroke sensor 34, which indicates the position of the plunger 8. However, the controller 33 may store a relative displacement reference value for a difference (relative displacement) between them, and may calculate the relative displacement ΔP based on this relative displacement reference value.

Next, a third embodiment of the present invention will be described with reference to FIGS. 7 to 13. In the following description, like elements will be denoted by the same reference numerals as those in the second embodiment, and only different elements will be described in detail.

As shown in FIG. 7, the present embodiment does not have the reference position sensor 31, but instead has a return position sensor 35 disposed on the cylindrical portion of the housing 2 for detecting that the linear motion member 6 of the ball and screw mechanism 5 is located at a predetermined base position. The return position sensor 35 detects that the linear motion member 6 is located at the "linear motion member base position (boosting member base position, linear motion member retraction limit position)", which is the maximally retracted position relative to the housing 2. The return position sensor 35 may be embodied by, for example, a known limit switch, as is the case with the reference position sensor 31 in the first and second embodiments, or may be embodied by any apparatus capable of outputting either an ON or OFF signal upon detection that the linear motion member 6 is located at the linear motion member base position.

Further, the brake pedal sensor 32 detects that the brake pedal 7 is not pressed, i.e., detects that the plunger 8 coupled to the brake pedal 7 via the input rod 28 is located at a "plunger base position (input member base position, plunger retraction limit position)", which is the maximally retracted position.

The controller 33 stores, as a base value Pm0', the detection value of the rotational position sensor 29 when the linear motion member 6 is located at the linear motion member base position. Further, the controller 33 stores, as a base value Ps0', the detection value of the stroke sensor 34 when the plunger 8 is located at the base position. Then, the controller 33 calculates the displacement of the linear motion member 6 by subtracting the base value Ps0' from the present detection value Ps of the rotational position sensor 29 and then multiplying the resulting value by the above-mentioned coefficient K1, or by referring to the predetermined conversion table to calculate it. Further, the controller 33 calculates the displacement of the plunger 8 by subtracting the base value Ps0' from the present detection value Ps of the stroke sensor 34 and then multiplying the resulting value by the above-mentioned coefficient K2, or by referring to the predetermined conversion table to calculate it. Then, the controller 33 calculates the relative displacement ΔP' between the plunger 8 and the linear motion member 6 from a difference between the calculated displacement of the linear motion member 6 and displacement of the plunger 8 (ΔP'=K1*(Pm−Pm0')−K2*(Ps−Ps0')).

After that, the controller 33 calculates the relative displacement ΔP between the plunger 8 and the linear motion member 6 based on the position where the plunger 8 reaches after being moved forward from the plunger base position by the above-mentioned predetermined distance ΔT (refer to FIG. 2B) relative to the linear motion member 6 (ΔP=ΔP'−ΔT =K1*(Pm−Pm0')−K2*(Ps−Ps0')−ΔT). The controller 33 controls an operation of the electric motor 3 based on the thus-obtained relative displacement ΔP.

The controller 33 can directly detect that the linear motion member 6 is located at the linear motion member base position based on the detection value of the return position sensor 35, or can indirectly detect it by detecting a non-braked state from, for example, whether the brake switch (brake pedal sensor) 32 is turned on or off, or whether power is supplied to the electric motor 3. Further, the controller 33 can directly detect that the plunger 8 is located at the plunger base position by detecting whether the brake switch (brake pedal sensor) 32 is turned on or off, or can indirectly detect it by detecting a non-braked state from, for example, detection of the return position sensor 35 or whether power is supplied to the electric motor 3.

Figure 8:
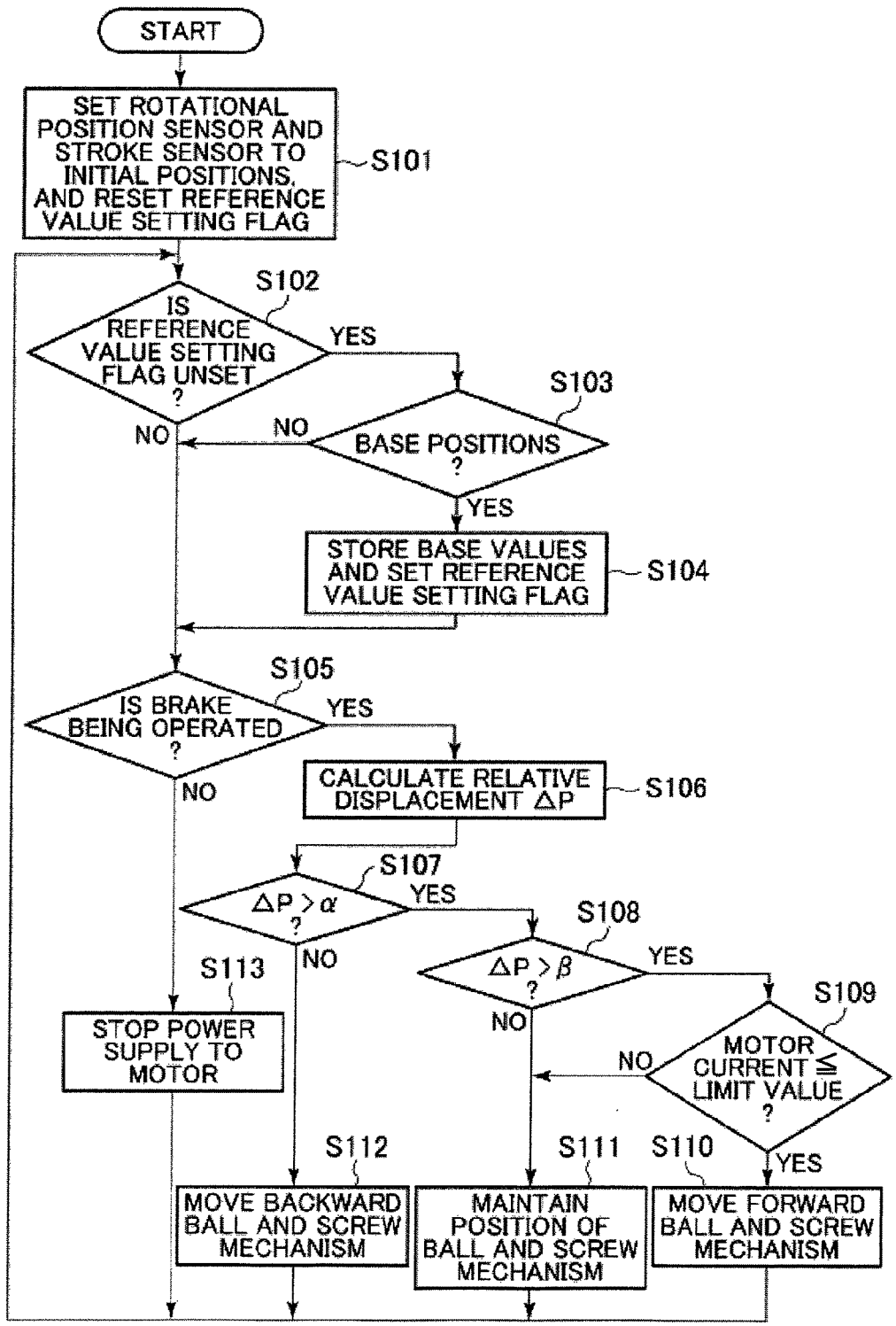
FIG. 8 is a flowchart illustrating control of the electric booster according to the third embodiment of the present invention.

Next, an example of a control flow for performing the control according to the present embodiment will be described with reference to FIG. 8. In FIG. 8, in step S101, the controller 33 sets predetermined initial values to the rotational position sensor 29 and the stroke sensor 34, and resets the reference value setting flag. Then, the processing proceeds to step S102. In step S102, the controller 33 determines whether the reference value setting flag is set. If the reference value setting flag is unset, the processing proceeds to step S103, in which the controller 33 stores the reference value. On the other hand, if the reference value setting flag is set, the processing proceeds to step S105.

In step S103, the controller 33 determines whether the linear motion member 6 and the plunger 8 are respectively located at the linear motion member base position and the plunger base position based on respective base position determination flags. More specifically, this determination processing can be performed, for example, according to the control flows shown in FIGS. 9 to 13. In an example shown in FIG. 9, in step S201, the controller 33 determines whether the brake pedal sensor 32 detects that the brake pedal 7 is pressed. If the brake pedal sensor 32 does not detect that the brake pedal 7 is pressed, the controller determines that the linear motion member 6 and the plunger 8 are respectively located at the linear motion member base position and the plunger base position, and then the processing proceeds to step S202. In step S202, the controller 33 sets the base position determination flag to 1. On the other hand, if the brake pedal sensor 32 detects that the brake pedal 7 is pressed, the controller 33 determines that the linear motion member 6 and the plunger 8 are not located at their respective base positions, and then the processing proceeds to step S203. In step S203, the controller resets the base position determination flag to 0. The brake pedal sensor 32 detects the position of the plunger 8 through the brake pedal 7 and the input rod 28, and therefore this method may not be able to maintain high detection accuracy.

Figure 10:
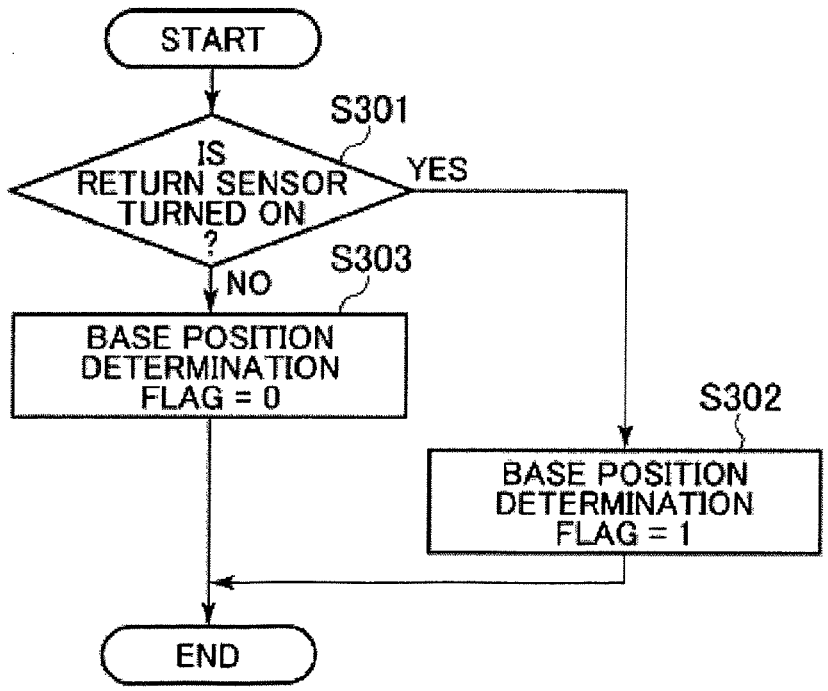
FIG. 10 is a flowchart illustrating control for determining the initial position based on the return switch in step S3 in the flowchart of FIG. 8.

In an example shown in FIG. 10, in step S301, the controller 33 determines whether the return position sensor 35 detects that the linear motion member 6 is located at the retracted position. If the return position sensor 35 detects that the linear motion member 6 is located at the retracted position, the controller 33 determines that the linear motion member 6 and the plunger 8 are located at their respective base positions, and then processing proceeds to step S302. In step S302, the controller 33 sets the base position determination flag to 1. On the other hand, if the return position sensor 35 does not detect that the linear motion member 6 is located at the retracted position, the controller 33 determines that the linear motion member 6 and the plunger 8 are not located at their respective base positions, and then the processing proceeds to step S303. In step S303, the controller 33 resets the base position determination flag to 0. In this example, the return position sensor 35 can directly detect the position of the linear motion member 6, and therefore higher detection accuracy can be expected compared to the detection relying on the brake pedal sensor 32.

Figure 9:
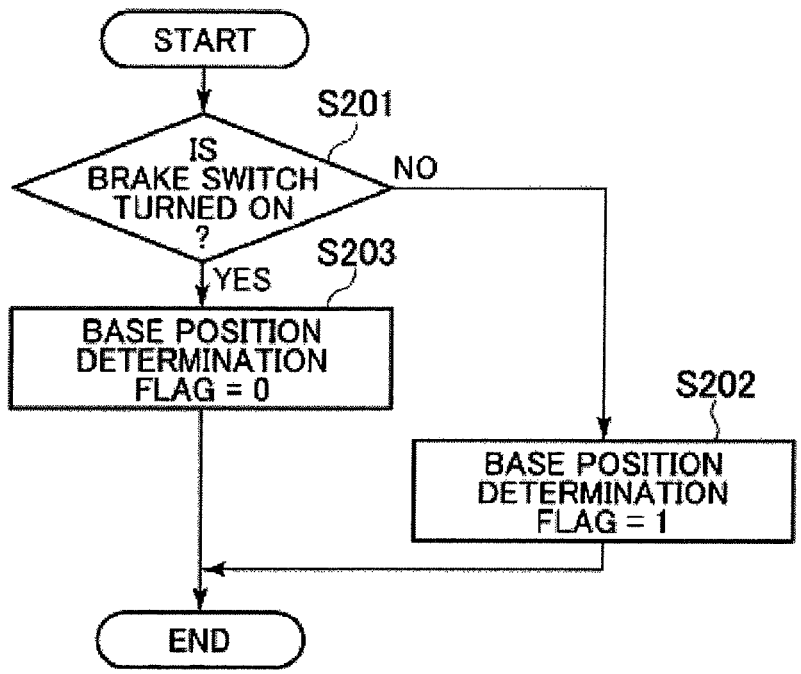
FIG. 9 is a flowchart illustrating control for determining an initial position based on a brake switch in step S3 in the flowchart of FIG. 8.
Figure 11:
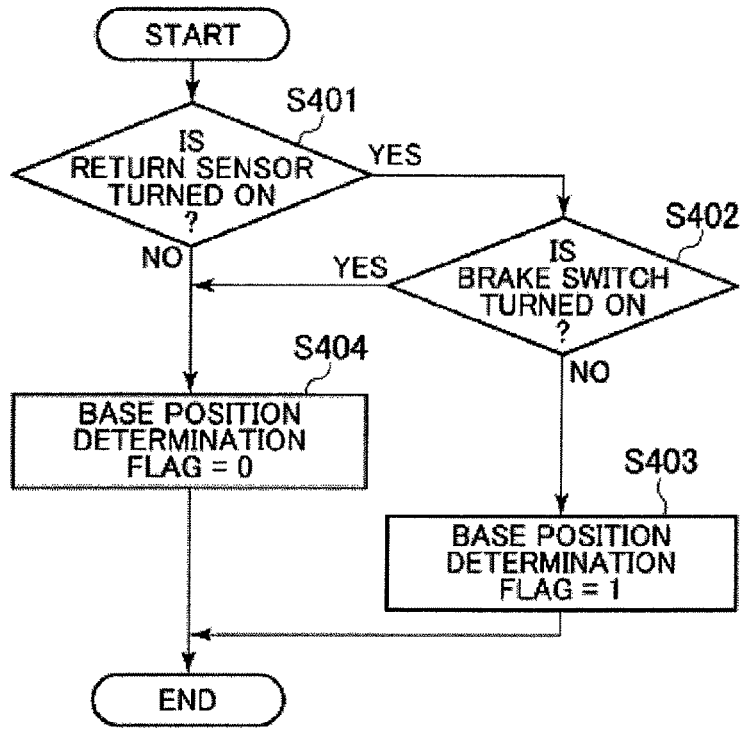
FIG. 11 is a flowchart illustrating control for determining the initial position based on the brake switch and the return switch in step S3 in the flowchart of FIG. 8.

An example shown in FIG. 11 is a combination of the determination relying on the brake pedal sensor 32 shown in FIG. 9 and the determination relying on the return position sensor 35 shown in FIG. 10. If the return position sensor 35 detects that the linear motion member 6 is located at its base position in step S401, and the brake pedal sensor 32 does not detect that the brake pedal 7 is pressed in step S402, the controller determines that the linear motion member 6 and the plunger 8 are located at their respective base positions. Then, the processing proceeds to step S403 in which the controller 33 sets the base position determination flag to 1. If the condition of step S401 and/or the condition of S402 are not satisfied, the controller 33 determines that the plunger 8 and the linear motion member 6 are not located at their respective base positions, and the processing proceeds to step S404. In step S404, the controller 33 resets the base position determination flag to 0. In this example, the controller 33 makes a determination based on the statuses of the two sensors, whereby the detection accuracy can be improved.

Figure 12:
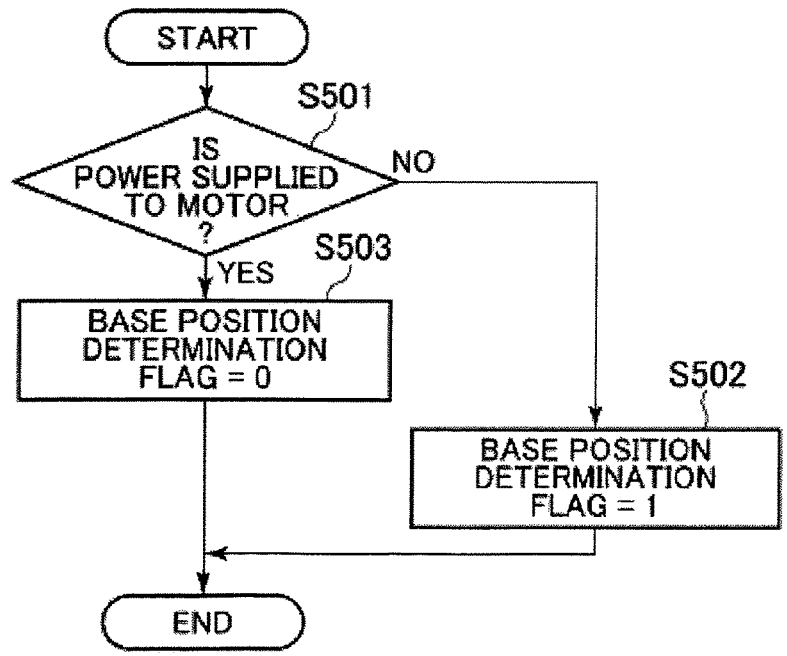
FIG. 12 is a flowchart illustrating control for determining the initial position based on a power supply to the electric motor in step S3 in the flowchart of FIG. 8.
Figure 13:
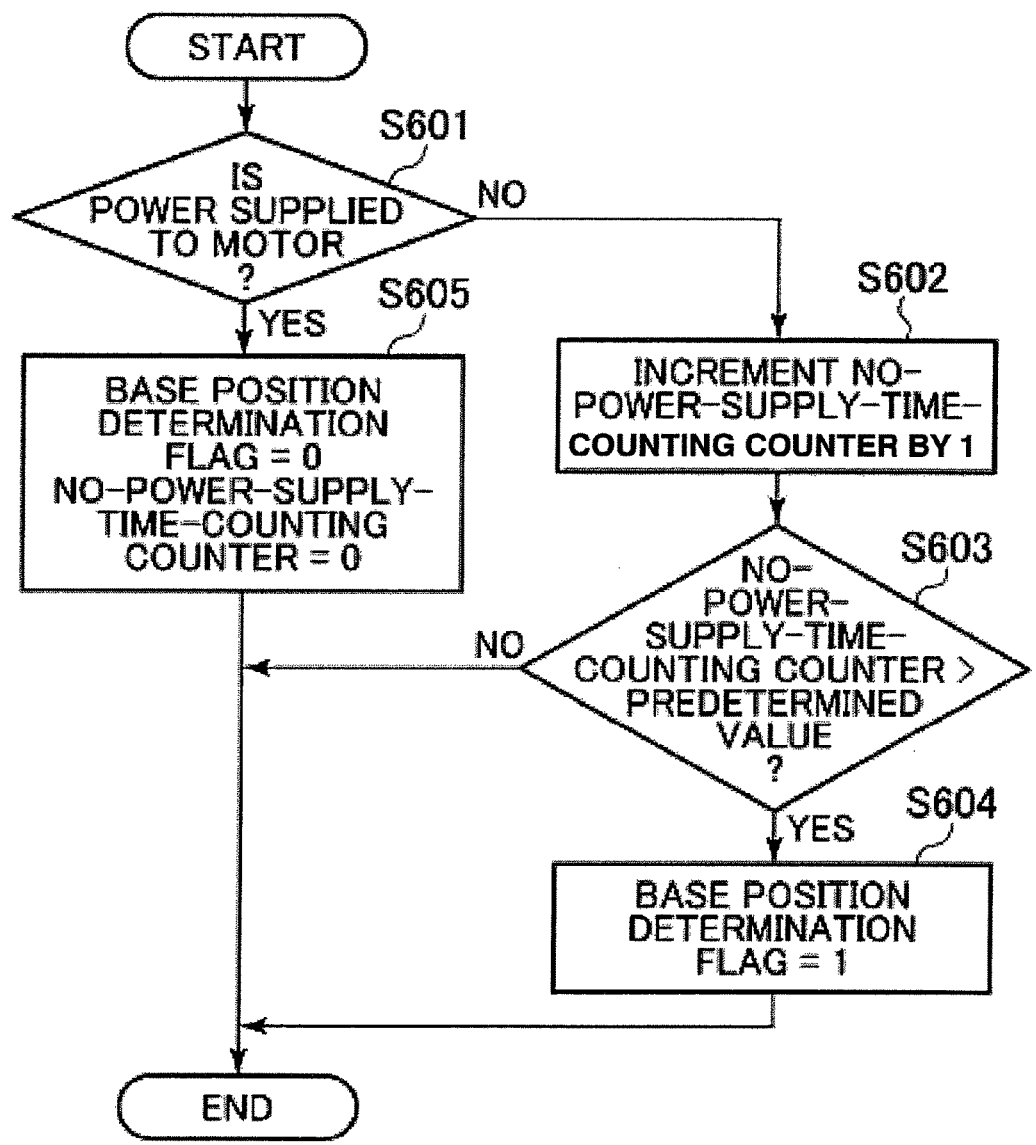
FIG. 13 is a flowchart illustrating control for determining the initial position based on a duration time when power is not supplied to the electric motor in step S3 in the flowchart of FIG. 8.

In an example shown in FIG. 12, in step S501, the controller makes a determination based on whether power is supplied to the electric motor 3. If power is not supplied to the electric motor 3, the controller 33 determines that the linear motion member 6 and the plunger 8 are located at their respective base positions, and then the processing proceeds to step S502. In step S502, the controller 33 sets the base position determination flag to 1. If power is supplied to the electric motor 3, the controller 33 determines that the linear motion member 6 and the plunger 8 are not located at their respective base positions, and then resets the base position determination flag to 0 in step S503. Further, in an example shown in FIG. 13, the controller 33 determines that the linear motion member 6 and the plunger 8 are located at their respective base positions based on whether power is supplied to the electric motor 3 for a predetermined time. More specifically, in step S601, the controller 33 checks the power supply state of the electric motor 3. If power is not supplied to the electric motor 3, the processing proceeds to step S602, in which the controller 33 increments a no-power-supply-time-counting timer, and then the processing proceeds to step S603. In step S603, the controller 33 waits until the value of no-power-supply-time-counting timer exceeds a predetermine value. When the value of no-power-supply-time-counting timer exceeds the predetermined value, the controller 33 determines that power is not supplied to the electric motor 3 for the predetermined time, and that the linear motion member 6 and the plunger 8 are located at their respective base positions. Then, the processing proceeds to step S604 in which the controller 33 sets the base position determination flag to 1. If the controller 33 determines that power is supplied to the electric motor 3 in step S601 before the value of the no-power-supply-time-counting timer exceeds the predetermine value in step S603, the controller 33 determines that the linear motion member 6 and the plunger 8 are not located at their respective base positions, and the processing proceeds to step S603 in which the controller 33 resets the base position determination flag to 0. In this example, it is possible to further accurately determine whether the linear motion member 6 and the plunger 8 are located on their respective base positions, even under an environment that may lead to a problem with the return characteristic of the linear motion member 6, such as a low temperature. Alternatively, the controller 33 may use any combination of the determination processes shown in FIGS. 9 to 13.

Returning to the flowchart of FIG. 8, in step S103, if the linear motion member 6 and the plunger 8 are located at their respective base positions, the processing proceeds to step S104. In step S104, the controller 33 stores the detection value of the rotational position sensor 29 at that time as the base value Pm0', stores the detection value of the stroke sensor 34 at that time as the base value Pm0', and sets the reference value setting flag. Then, the processing proceeds to step S105. On the other hand, if the linear motion member 6 and the plunger 8 are not located at their respective base positions, the processing directly proceeds to step S105.

In step S105, the controller 33 determines whether the brake pedal 7 is operated. If the brake pedal 7 is not pressed and operated, the processing proceeds to step S113 in which the controller 33 stops the power supply to the electric motor 3, or maintains such a state that power is not supplied to the electric motor 3, and then the processing returns to step S102. If the brake pedal 7 is currently being operated, the processing proceeds to step S106. In step S106, the controller calculates the displacement of the linear motion member 6 by subtracting the base value Ps0' from the present detection value Ps of the rotational position sensor 29 and then multiplying the resulting value by the above-mentioned coefficient K1, or by referring to the predetermine conversion table and calculating it. Further, the controller 33 calculates the displacement of the plunger 8 by subtracting the base value Ps0' from the present detection value Ps of the stroke sensor 34 and then multiplying the resulting value by the above-mentioned coefficient K2, or by referring to the predetermine conversion table and then calculating it. Then, the controller 33 calculates the relative displacement $\Delta P'$ between the plunger 8 and the linear motion member 6 from the initial position by calculating a difference between the thus-obtained displacement of the linear motion member 6 and displacement of the plunger 8 ($\Delta P' = K1*(Pm-Pm0') - K2*(Ps-Ps0')$).

Further, the controller 33 calculates the relative displacement $\Delta P$ between the plunger 8 and the linear motion member 6 based on the position where the plunger 8 reaches by being moving forward by the above-mentioned predetermined distance $\Delta T$ (refer to FIG. 2B) from the plunger base position relative to the linear motion member 6 ($\Delta P = \Delta P' - \Delta T = K1*(Pm-Pm0') - K2*(Ps-Ps0') - \Delta T$). Then, the processing proceeds to step S107. From step S107 to step S112, the controller 33 performs the same processing as the control shown in FIG. 3 based on the thus-calculated $\Delta P$. Then, the processing returns to step S2. In this way, the controller 33 can perform the same control as the above-described second embodiment.

Instead of calculating the relative displacement $\Delta P'$ with use of the rotational position sensor 29 and the stroke sensor 34, the present embodiment may further include the relative displacement sensor 30, and may directly detect the relative displacement $\Delta P'$, as is the case with the first embodiment. In this case, when the controller 33 detects the base positions of the linear motion member 6 and the plunger 8 with use of the brake pedal sensor 32 and the return position sensor 35, the controller 33 stores the detection value of the relative displacement sensor 30 as the base value, and detects the relative displacement $\Delta P'$.

Next, a method for adjusting the input/output characteristic of the electric booster 1 will be described with reference to FIGS. 14 to 16. An example of the input/output characteristic of the electric booster 1 will be described with reference to FIGS. 14 and 15. The electric booster 1 has the following input/output characteristic. When the plunger 8 is moved from the initial position by the distance $\Delta T$ (refer to FIG. 2B) relative to the linear motion member 6 upon pressing of the brake pedal 7 to reach the reference position, the controller 33 starts to control an operation of the electric motor 3. At the early stage of a brake operation, the existence of the space C1 between the plunger 8 and the reaction member 11 (refer to FIG. 14B) allows the plunger 8 to be moved without being received a reaction force from the reaction member 11, thereby showing so-called a jump-in characteristic to realize a quick rise of the output (brake force) (refer to the timing "A" in FIG. 15). After that, an output is generated in proportion to the input at the boosting ratio according to the ratio of the pressure-receiving area A1 of the linear motion member 6 and the pressure-receiving ratio A2 of the plunger 8 to the reaction member 11 (refer to the solid line in FIG. 15).

At this time, if the space C1 between the reaction member 11 and the plunger 8 is smaller than the predetermined size shown in FIG. 14B (refer to FIG. 14A), the plunger 8 abuts against the reaction member 11 earlier, resulting in a reduction in the output during the jump-in period (refer to the broken line in FIG. 15). On the other hand, if the space C1 is larger (refer to FIG. 14C), the plunger 8 is delayed in abutting against the reaction member 11, resulting in an increase in the output during the jump-in period (refer to the chain line in FIG. 15). In this way, the input/output characteristic varies depending on the precision of the space C1.

Figure 16:
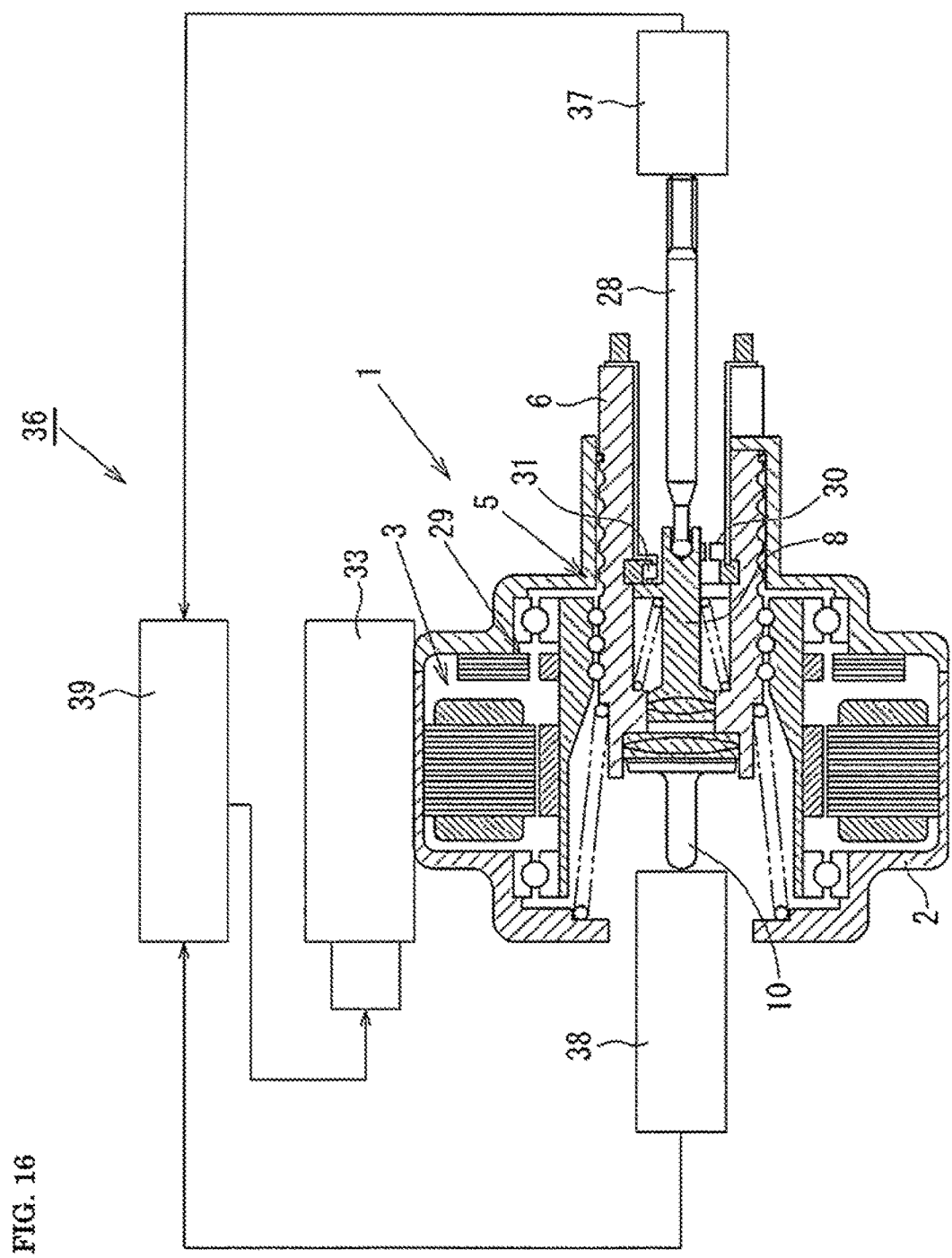
FIG. 16 is a block diagram illustrating a structural overview of an adjustment apparatus of an electric booster according to an embodiment of the present invention.

The present embodiment adjusts the input/output characteristic of the electric booster 1 with use of an adjustment apparatus 36 shown in FIG. 16. As shown in FIG. 16, the adjustment apparatus 36 includes a thrust force generation unit 37 configured to provide a desired thrust force to the input rod 28 of the electric booster 1, a thrust force measurement unit 38 configured to measure an output of the output rod 10, and an adjustment unit 39 configured to obtain the input/output characteristic of the electric booster 1 based on the thrust force of the thrust force generation unit 37 and the thrust force measured by the thrust force measurement unit 38 to determine a correction amount.

The adjustment unit 39 provides a predetermined thrust force (input) to the electric booster 1 with use of the thrust force generation unit 37, and measures the output thereof with use of the thrust force measurement unit 38. At this time, as shown in FIG. 15, if the space C1 between the reaction member 11 and the plunger 8 is smaller than the predetermined value, a predetermined input B leads to a smaller output B1 than a predetermined output B0. On the other hand, if the space C1 is larger than the predetermined value, the predetermined input B leads to a larger output B2 than the predetermined output B0. Therefore, the adjustment unit 39 determines a correction amount to the relative displacement $\Delta P$ to be output by the relative displacement sensor 30 (or calculated in the second and third embodiments) according to whether the output is larger or smaller so that an actual output can be equal to the predetermined output B0, and then writes the correction amount in a non-volatile memory 33A which is a storage unit of the controller 33. The controller 33 controls an operation of the electric motor 3 based on the relative displacement $\Delta P$ corrected by the stored correction amount.

As a result, it is possible to make a post-assembling adjustment of the variation in the input/output characteristics of individual electric boosters 1 due to, for example, differences in the dimensional precision of the respective parts and the dimensional precision of the installation positions of various sensors and switches, thereby improving the control accuracy. The above-mentioned method can be also applied to the electric booster 1 according to the second or third embodiment, by determining a correction amount to the calculated relative displacement $\Delta P$ and storing it in the storage unit of the controller 33.

The above-described first to third embodiments use the reaction member 11, which is an elastic member, as a thrust force transmission mechanism (so-called reaction-disc booster). However, the present invention is not limited thereto, and can be applied to, a so-called lever-type booster. Further, the present invention can be also applied to a booster configured such that a piston (having a large pressure-receiving area) to be driven by an actuator as a boosting member, and an input piston to be driven by a brake pedal as an input member are inserted through a master cylinder, and a reaction force is directly fed back from the input piston, which faces brake fluid in the master cylinder, to the brake pedal. Further, in the above-described embodiments, the reaction member 11 is contained in the large-diameter bore 24 of the linear motion member 6. However, the present invention is not limited thereto. The reaction member 11 may be contained in a cup-like portion formed on the end of the output rod 10 which faces the linear motion member 6 so that the front end of the linear motion member 6 and the front end of the plunger 8 abut against the reaction member 11.

According to the booster of the above-described embodiments, the booster includes an input member configured to be moved forward or backward according to, an operation of a brake pedal, a boosting member disposed so as to be movable relative to the input member, an actuator configured to drive the boosting member, a thrust force transmission mechanism configured to transmit a thrust force of the input member and the boosting member to a master cylinder, and transmit a reaction force from the master cylinder to the input member and the boosting member at a predetermined ratio, a relative displacement detector configured to detect a relative displacement between the input member and the boosting member, a controller configured to control an operation of the actuator based on the relative displacement detected by the relative displacement detector, and a reference position detector configured to detect that a relative position of the input member to the boosting member coincides with a predetermined reference position. This configuration can improve the control accuracy of the booster, and provide the stable input/output characteristic.

According to the booster of the above-described embodiments, the controller stores a detection value of the relative displacement detector as a relative displacement reference value when the reference position detector detects that the relative position of the input member to the boosting member coincides with the predetermined reference position, and the controller determines the relative displacement between the input member and the boosting member based on the relative displacement reference value. This configuration can reduce an influence of, for example, signal drift of the relative displacement detector due to a temperature change to improve the control accuracy, and provide stable control.

According to the booster of the above-described embodiments, the thrust force transmission mechanism includes a thrust force transmission member to be engaged with the input member and the boosting member to allow the relative displacement therebetween, and a hydraulic pressure generation mechanism configured to generate a hydraulic pressure in the master cylinder by the thrust force transmitted from the input member and the boosting member to the thrust force transmission mechanism.

According to the booster of the above-described first embodiment, the reference position detector comprises a switch unit configured to be turned on or off when the reference position detector detects that the relative position of the input member to the boosting member coincides with the predetermined reference position.

According to the booster of the above-described second and third embodiments, the reference position detector includes an input member base position detector for detecting that the input member is located at a predetermined input member base position, and a boosting member base position detector for detecting that the boosting member is located at a predetermined boosting member base position, and the reference position detector detects the reference position of the relative displacement by detecting that the input member is located at the input member base position and detecting that the boosting member is located at the boosting member base position.

According to the booster of the above-described second and third embodiments, the relative displacement detector includes an input member displacement detector configured to detect a displacement of the input member, and a boosting member displacement detector configured to detect a displacement of the boosting member, and the relative displacement detector detects the relative displacement between the input member and the boosting member based on the displacement of the input member and the displacement of the boosting member.

According to the booster of the above-described second and third embodiments, the controller includes a storage unit configured to store a correction amount to the relative displacement detected by the relative position detector.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2010-218872, filed on Sep. 29, 2010. The entire disclosure of Japanese Patent Application No. 2010-218872, filed on Sep. 29, 2010 including specification, claims, drawings and summary is incorporated herein by reference in its entirety.

What is claimed is:

1. A booster comprising:
an input member configured to be moved forward or backward according to an operation of a brake pedal;
a boosting member disposed so as to be movable relative to the input member;
an actuator configured to drive the boosting member;
a thrust force transmission mechanism configured to transmit a thrust force of the input member and the boosting member to a master cylinder, and transmit a reaction force from the master cylinder to the input member and the boosting member at a predetermined ratio;
a relative displacement detector configured to detect a relative displacement between the input member and the boosting member;
a controller configured to control an operation of the actuator based on the relative displacement detected by the relative displacement detector; and
a reference position detector configured to detect that a position of the input member relative to the boosting member coincides with a predetermined reference position,
wherein the thrust force transmission mechanism includes:
a thrust force transmission member to be engaged with the input member and the boosting member to allow the relative displacement therebetween, and being capable of abutment against an end of the input member; and
a hydraulic pressure generation mechanism configured to generate a hydraulic pressure in the master cylinder by the thrust force transmitted from the input member and the boosting member to the thrust force transmission mechanism, wherein the controller stores a detection value of the relative displacement detector as a relative displacement reference value when the reference position detector detects that the position of the input member relative to the boosting member coincides with the reference position at which a distance between the input member and the boosting member is a predetermined distance, and the controller determines the relative displacement between the input member and the boosting member by using the relative displacement reference value as a reference.

2. The booster according to claim 1, wherein the reference position detector comprises a switch unit configured to be turned on or off when the reference position detector detects that the relative position of the input member to the boosting member coincides with the predetermined reference position.

3. The booster according to claim 2, wherein the relative displacement detector includes an input member displacement detector configured to detect a displacement of the input member, and a boosting member displacement detector configured to detect a displacement of the boosting member, and
wherein the relative displacement detector detects the relative displacement between the input member and the boosting member based on the displacement of the input member and the displacement of the boosting member.

4. The booster according to claim 1, wherein the reference position detector includes an input member base position detector for detecting that the input member is located at a predetermined input member base position, and a boosting member base position detector for detecting that the boosting member is located at a predetermined boosting member base position, and
wherein the reference position detector detects the reference position of the relative displacement by detecting that the input member is located at the input member base position and detecting that the boosting member is located at the boosting member base position.

5. The booster according to claim 4, wherein the relative displacement detector includes an input member displacement detector configured to detect a displacement of the input member, and a boosting member displacement detector configured to detect a displacement of the boosting member, and
wherein the relative displacement detector detects the relative displacement between the input member and the boosting member based on the displacement of the input member and the displacement of the boosting member.

6. The booster according to claim 1, wherein the thrust force transmission mechanism includes a thrust force transmission member to be engaged with the input member and the boosting member to allow the relative displacement therebetween, and a hydraulic pressure generation mechanism configured to generate a hydraulic pressure in the master cylinder by the thrust force transmitted from the input member and the boosting member to the thrust force transmission mechanism.

7. The booster according to claim 1, wherein the reference position detector comprises a switch unit configured to be turned on or off when the reference position detector detects that the relative position of the input member to the boosting member coincides with the predetermined reference position.

8. The booster according to claim 1, wherein the reference position detector includes an input member base position detector for detecting that the input member is located at a predetermined input member base position, and a boosting member base position detector for detecting that the boosting member is located at a predetermined boosting member base position, and
wherein the reference position detector detects the reference position of the relative displacement by detecting that the input member is located at the input member base position and detecting that the boosting member is located at the boosting member base position.

9. The booster according to claim 1, wherein the relative displacement detector includes an input member displacement detector configured to detect a displacement of the input member, and a boosting member displacement detector configured to detect a displacement of the boosting member, and
wherein the relative displacement detector detects the relative displacement between the input member and the boosting member based on the displacement of the input member and the displacement of the boosting member.

10. The booster according to claim 1, wherein the controller includes a storage unit configured to store a correction amount to the relative displacement detected by the relative position detector.

11. A booster comprising:
an input member configured to be moved forward or backward according to an operation of a brake pedal;
a boosting member configured to be moved according to a forward or backward movement of the input member to generate a hydraulic pressure in a master cylinder;
an actuator configured to drive the boosting member;
a thrust force transmission mechanism configured to transmit a part of a reaction force of the hydraulic pressure generated in the master cylinder by a thrust force transmission member abutting against an end of the input member;
a relative displacement detector configured to detect a relative displacement between the input member and the boosting member;
a controller configured to control an operation of the actuator; and
a reference position detector configured to detect that a relative position of the input member to the boosting member coincides with a predetermined reference position at which a distance between the input member and the boosting member is a predetermined distance,
wherein the controller calculates the relative displacement between the input member and the boosting member by using a detection value of the relative displacement detector as a reference when the reference position detector detects that the relative position of the input member to the boosting member coincides with the predetermined reference position, and the controller controls the operation of the actuator based on the calculated relative displacement.

12. The booster according to claim 11, wherein the reference position detector comprises a switch unit configured to be turned on or off when the reference position detector detects that the relative position of the input member to the boosting member coincides with the predetermined reference position.

13. The booster according to claim 12, wherein the relative displacement detector includes an input member displacement detector configured to detect a displacement of the input member, and a boosting member displacement detector configured to detect a displacement of the boosting member, and wherein the relative displacement detector detects the relative displacement between the input member and the boosting member based on the displacement of the input member and the displacement of the boosting member.

14. The booster according to claim 11, wherein the reference position detector includes an input member base position detector for detecting that the input member is located at a predetermined input member base position, and a boosting member base position detector for detecting that the boosting member is located at a predetermined boosting member base position, and wherein the reference position detector detects the reference position of the relative displacement by detecting that the input member is located at the input member base position and detecting that the boosting member is located at the boosting member base position.

15. The booster according to claim 14, wherein the relative displacement detector includes an input member displacement detector configured to detect a displacement of the input member, and a boosting member displacement detector configured to detect a displacement of the boosting member, and wherein the relative displacement detector detects the relative displacement between the input member and the boosting member based on the displacement of the input member and the displacement of the boosting member.

16. A booster comprising:

a boosting member configured to be moved by an actuator according to a forward or backward movement of an input member configured to be moved forward or backward according to an operation of a brake pedal, to generate a hydraulic pressure in a master cylinder;

a thrust force transmission mechanism configured to transmit a part of a reaction force from the master cylinder to the input member by abutting against an end of the input member;

a relative displacement detector configured to detect a relative displacement between the input member and the boosting member;

a controller configured to control an operation of the actuator; and a reference position detector configured to detect that a relative position of the input member to the boosting member coincides with a predetermined reference position at which a distance between the input member and the boosting member is a predetermined distance, wherein the controller stores a detection value of the relative displacement detector as a relative displacement reference value when the reference position detector detects that the relative position of the input member to the boosting member coincides with the predetermined reference position, calculates the relative displacement between the input member and the boosting member by using the relative displacement reference value as a reference, and controls the operation of the actuator based on the calculated relative displacement.

17. The booster according to claim 16, wherein the reference position detector comprises a switch unit configured to be turned on or off when the reference position detector detects that the relative position of the input member to the boosting member coincides with the predetermined reference position.

18. The booster according to claim 16, wherein the relative displacement detector includes an input member displacement detector configured to detect a displacement of the input member, and a boosting member displacement detector configured to detect a displacement of the boosting member, and wherein the relative displacement detector detects the relative displacement between the input member and the boosting member based on the displacement of the input member and the displacement of the boosting member.

* * * * *